(12) United States Patent
Benkreira et al.

(10) Patent No.: US 11,030,624 B2
(45) Date of Patent: Jun. 8, 2021

(54) TECHNIQUES TO PERFORM COMPUTATIONAL ANALYSES ON TRANSACTION INFORMATION FOR AUTOMATIC TELLER MACHINES

(71) Applicant: Capital One Services, LLC, McLean, VA (US)

(72) Inventors: Abdelkader M'Hamed Benkreira, Washington, DC (US); Mykhaylo Bulgakov, Arlington, VA (US); Adam Vukich, Alexandria, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/152,189

(22) Filed: Oct. 4, 2018

(65) Prior Publication Data

US 2020/0111099 A1    Apr. 9, 2020

(51) Int. Cl.
*G06Q 20/40* (2012.01)
*G06Q 20/10* (2012.01)
*G06N 20/00* (2019.01)

(52) U.S. Cl.
CPC ......... *G06Q 20/4016* (2013.01); *G06N 20/00* (2019.01); *G06Q 20/1085* (2013.01); *G06Q 20/4014* (2013.01)

(58) Field of Classification Search
CPC .......... G06Q 20/4016; G06Q 20/1085; G06Q 20/4014; G06Q 20/40; G06Q 20/3223; G06Q 20/3221; G06Q 20/40145; G06Q 20/425; G06Q 40/02; G06Q 20/042; G06Q 20/322; G06Q 20/18; G06Q 20/388; G06Q 40/00; G06Q 20/3224; G06Q 20/10; G06Q 20/32; G06Q 20/3674; G06Q 20/403; G06Q 20/409; G06Q 20/401; G06Q 20/3274; G06Q 20/385; G06Q 20/04; G06Q 20/223; G06Q 20/352; G06Q 20/382; G06Q 20/389; G06Q 20/4012; G06Q 20/00; G06Q 20/02; G06Q 20/108; G06Q 20/12; G06Q 20/3276; G06Q 20/3278; G06Q 20/34;

(Continued)

(56) References Cited

U.S. PATENT DOCUMENTS 4,317,957 A * 3/1982 Sendrow ................ G06Q 20/02
235/379
5,802,199 A * 9/1998 Pare, Jr. .................. G06F 21/32
382/115

(Continued)

*Primary Examiner* — Slade E Smith
(74) *Attorney, Agent, or Firm* — Kacvinsky Daisak Bluni PLLC

(57) ABSTRACT

Various embodiments are generally directed to techniques to detect suspicious activity associated with ATMs and cause dispense of money with known and/or stored serial numbers. Embodiments include techniques to perform a computing analysis utilizing the transaction information to determine whether the transaction is suspicious or not suspicious, for example. The computing analysis comprising at least one of applying one or more factors to the transaction information and applying a model to the transaction information. Embodiments also include an ATM communicating with one or more other systems, such as transaction information with a transaction services system and alerts with an emergency services system.

20 Claims, 11 Drawing Sheets

(58) Field of Classification Search
CPC .... G06Q 20/341; G06Q 20/342; G06Q 20/36;
G06Q 20/405; G06Q 20/4097; G06Q
30/02; G06N 99/005; G06N 3/08; G07F
19/20; G07F 19/201; G07F 19/207; G07F
19/205; G07F 19/2055; G07F 19/203;
G07F 19/202; G07F 19/211; G07F 7/08;
G07F 17/3234; G07F 17/3241; G07F
7/04; G07F 19/00; G07F 19/208; G07F
7/10; G07F 7/1075; G07F 11/70; G07F
17/0014; G07F 17/26; G07F 7/025; G07F
7/1008; G07G 3/003; H04W 4/021;
G06K 9/00442; G06K 9/18; G06K
7/0004; G06K 9/00087; G06K 9/00469;
G06K 9/6255; A61L 2/10; G06F 21/32;
G06F 21/554; G06F 21/6218; G06F
21/83; G06F 21/86; G06F 2211/008;
G06F 2221/2117; G06F 2221/2143;
G07C 9/00031; G07C 9/00158; G07C
9/00166; H04L 63/0442; H04L 63/0823;
H04L 2463/102; H04L 63/0861; G07D
11/0066
USPC .......................................................... 705/43
See application file for complete search history.

(56) References Cited

U.S. PATENT DOCUMENTS

| | | | | | |
|---|---|---|---|---|---|
| 6,311,165 | B1* | 10/2001 | Coutts | | G06Q 20/1085 |
| | | | | | 235/379 |
| 9,224,273 | B1* | 12/2015 | Atkinson | | G07F 19/201 |
| 9,594,954 | B1* | 3/2017 | Walker | | G06Q 20/1085 |
| 2002/0128929 | A1* | 9/2002 | Urabe | | G06O 20/10 |
| | | | | | 705/26.35 |
| 2003/0217005 | A1* | 11/2003 | Drummond | | G06Q 30/06 |
| | | | | | 705/43 |
| 2003/0222135 | A1* | 12/2003 | Stoutenburg | | G06Q 20/10 |
| | | | | | 235/379 |
| 2007/0172106 | A1* | 7/2007 | Paraskevakos | | G06K 9/6857 |
| | | | | | 382/135 |
| 2007/0244740 | A1* | 10/2007 | Desenberg | | G06Q 40/00 |
| | | | | | 705/7.41 |
| 2008/0290154 | A1* | 11/2008 | Barnhardt | | G06Q 20/108 |
| | | | | | 235/379 |
| 2009/0106148 | A1* | 4/2009 | Prada | | G06Q 20/10 |
| | | | | | 705/41 |
| 2009/0212104 | A1* | 8/2009 | Smith | | G07F 7/04 |
| | | | | | 235/379 |
| 2010/0241564 | A1* | 9/2010 | Miller | | G06Q 20/3221 |
| | | | | | 705/43 |
| 2011/0238574 | A1* | 9/2011 | Miller | | G07F 19/201 |
| | | | | | 705/43 |
| 2012/0077476 | A1* | 3/2012 | Paraskevakos | | G06Q 20/32 |
| | | | | | 455/414.2 |
| 2012/0109802 | A1* | 5/2012 | Griffin | | G06Q 40/00 |
| | | | | | 705/35 |
| 2012/0223133 | A1* | 9/2012 | Miller | | G06Q 20/3223 |
| | | | | | 235/379 |
| 2013/0311365 | A1* | 11/2013 | Miller | | G06Q 20/3223 |
| | | | | | 705/43 |
| 2013/0346294 | A1* | 12/2013 | Faith | | G06F 21/552 |
| | | | | | 705/39 |
| 2014/0046842 | A1* | 2/2014 | Irudayam | | G06Q 20/3223 |
| | | | | | 705/43 |
| 2014/0129433 | A1* | 5/2014 | Rosenberger | | G06Q 20/102 |
| | | | | | 705/40 |
| 2014/0351125 | A1* | 11/2014 | Miller | | G06Q 20/1085 |
| | | | | | 705/43 |
| 2015/0046351 | A1* | 2/2015 | Tayebnejad | | G06Q 30/0185 |
| | | | | | 705/318 |
| 2015/0213421 | A1* | 7/2015 | Block | | G07F 19/20 |
| | | | | | 705/43 |
| 2015/0278462 | A1* | 10/2015 | Smoley | | G06Q 40/08 |
| | | | | | 705/2 |
| 2015/0278818 | A1* | 10/2015 | Horgan | | G07F 19/203 |
| | | | | | 705/43 |
| 2015/0279155 | A1* | 10/2015 | Chun | | G07F 17/3234 |
| | | | | | 463/25 |
| 2015/0356567 | A1* | 12/2015 | Srinivasan | | G06K 9/2054 |
| | | | | | 705/44 |
| 2016/0012411 | A1* | 1/2016 | Kursun | | G06Q 40/02 |
| | | | | | 705/42 |
| 2016/0048817 | A1* | 2/2016 | Koeppel | | G06Q 20/405 |
| | | | | | 705/43 |
| 2016/0085955 | A1* | 3/2016 | Lerner | | G06F 21/725 |
| | | | | | 726/20 |
| 2016/0292963 | A1* | 10/2016 | Chun | | G06Q 20/1085 |
| 2017/0213278 | A1* | 7/2017 | Wind | | G06Q 20/20 |
| 2017/0236101 | A1* | 8/2017 | Irudayam | | G06Q 20/3223 |
| | | | | | 382/140 |
| 2017/0309121 | A1* | 10/2017 | Chun | | G06Q 20/4016 |
| 2018/0114216 | A1* | 4/2018 | Joseph | | G06Q 20/36 |
| 2018/0130162 | A1* | 5/2018 | Manilla | | G06Q 50/34 |
| 2018/0232727 | A1* | 8/2018 | Grosser | | G06Q 30/06 |
| 2018/0314975 | A1* | 11/2018 | Zang | | G06N 20/20 |
| 2019/0243933 | A1* | 8/2019 | Roemerman | | G06N 20/00 |

* cited by examiner

*300*

```
┌─────────────────────────────────────────────┐
│  RECEIVE A TRANSACTION REQUEST INCLUDING    │
│  TRANSACTION INFORMATION FOR A TRANSACTION TO│
│              WITHDRAWAL MONEY               │
│                                             │
│                     305                     │
└─────────────────────────────────────────────┘
                       │
┌─────────────────────────────────────────────┐
│   PERFORM A COMPUTING ANALYSIS UTILIZING THE│
│  TRANSACTION INFORMATION TO DETERMINE WHETHER│
│   THE TRANSACTION IS SUSPICIOUS OR NOT SUSPICIOUS│
│                                             │
│                     310                     │
└─────────────────────────────────────────────┘
                       │
┌─────────────────────────────────────────────┐
│   SEND A TRANSACTION RESPONSE IN RESPONSE TO THE│
│   TRANSACTION REQUEST, THE TRANSACTION RESPONSE│
│      INCLUDING AN INDICATION OF A RESULT OF THE│
│       COMPUTING ANALYSIS AND TO CAUSE THE ATM TO│
│    DISPENSE THE MONEY, AND STORE ONE OR MORE SERIAL│
│    NUMBERS FOR AT LEAST A PORTION OF THE DISPENSED│
│   MONEY WHEN THE INDICATION OF THE RESULT INDICATES│
│            THE TRANSACTION IS SUSPICIOUS    │
│                                             │
│                     315                     │
└─────────────────────────────────────────────┘
```

```
┌─────────────────────────────────────────┐
│  RECEIVE A REQUEST TO PERFORM A         │
│  TRANSACTION TO WITHDRAWAL MONEY        │
│                                          │
│                  345                     │
└─────────────────────────────────────────┘
                     │
┌─────────────────────────────────────────┐
│  PERFORM A COMPUTING ANALYSIS UTILIZING  │
│  TRANSACTION INFORMATION ASSOCIATED WITH │
│  THE TRANSACTION TO DETERMINE IF THE     │
│  TRANSACTION IS SUSPICIOUS, THE COMPUTING│
│  ANALYSIS INCLUDING AT LEAST ONE OF      │
│  APPLYING ONE OR MORE FACTORS TO THE     │
│  TRANSACTION INFORMATION AND APPLYING A  │
│  MODEL TO THE TRANSACTION INFORMATION    │
│                                          │
│                  350                     │
└─────────────────────────────────────────┘
                     │
┌─────────────────────────────────────────┐
│  CAUSE DISPENSING OF THE MONEY, AND      │
│  STORE A SERIAL NUMBER OF AT LEAST A     │
│  PORTION OF THE MONEY IN RESPONSE TO     │
│  DETERMINING THE TRANSACTION IS          │
│  SUSPICIOUS                              │
│                                          │
│                  355                     │
└─────────────────────────────────────────┘
```

> RECEIVE A REQUEST TO PERFORM A TRANSACTION TO WITHDRAWAL ONE OR MORE MONEY
>
> *375*

> SEND A TRANSACTION REQUEST INCLUDING TRANSACTION INFORMATION FOR THE TRANSACTION, THE TRANSACTION INFORMATION INCLUDING A SECURITY TOKEN FOR THE TRANSACTION AND AN ACCOUNT IDENTIFIER FOR THE TRANSACTION
>
> *380*

> RECEIVE A TRANSACTION RESPONSE TO THE TRANSACTION REQUEST, THE TRANSACTION RESPONSE INCLUDING AN INDICATION OF A RESULT OF A COMPUTING ANALYSIS PERFORMED WITH THE TRANSACTION INFORMATION
>
> *385*

> CAUSE DISPENSING OF THE MONEY, AND STORE ONE OR MORE SERIAL NUMBERS OF THE MONEY BASED ON THE INDICATION OF THE RESULT INDICATING THE TRANSACTION IS SUSPICIOUS
>
> *390*

*FIG. 3C*

EMERGENCY SERVICES SYSTEM 506

TRANSACTION SERVICES SYSTEM 504

TECHNIQUES TO PERFORM COMPUTATIONAL ANALYSES ON TRANSACTION INFORMATION FOR AUTOMATIC TELLER MACHINES

BACKGROUND

Fraudulent use of self-service business systems such as automated teller machine (ATM) systems has become a substantial problem for banks and other financial institutions. Customer complaints have been received that "phantom withdrawals" have been made from their accounts by persons passing themselves off as the customers.

SUMMARY

Embodiments, as discussed herein, may include a computing device, a system, an apparatus, and so forth having a memory to store instructions, and processing circuitry, coupled with the memory, operable to execute the instructions, that when executed, cause the processing circuitry to receive, via one or more network links, from an automatic teller machine (ATM) a transaction request comprising transaction information for a transaction to withdraw money, perform a computing analysis utilizing the transaction information to determine whether the transaction is suspicious or not suspicious, the computing analysis comprising at least one of applying one or more factors to the transaction information and applying a model to the transaction information, and send, via the one or more network links, a transaction response to the ATM and in response to the transaction request, the transaction response comprising an indication of a result of the computing analysis and to cause the ATM to dispense the money, wherein at least a portion of the money having known serial numbers stored in memory or storage when the indication of the result indicates the transaction is suspicious.

Embodiments may also include a computing device, a system, an apparatus, and so forth having a memory to store instructions, and processing circuitry, coupled with the memory, operable to execute the instructions, that when executed, cause the processing circuitry to receive, via one or more input devices, a request to perform a transaction to withdraw money, perform a computing analysis utilizing transaction information associated with the transaction to determine if the transaction is suspicious, the computing analysis comprising at least one of applying one or more factors to the transaction information and applying a model to the transaction information, cause dispensing of money, and store one or more serial numbers of the dispensed money in response to determining the transaction is suspicious.

In some instances, embodiments also include A non-transitory computer-readable storage medium storing computer-readable program code executable by a processor to receive, via one or more input devices, a request to perform a transaction to withdraw money, send, via one or more network links, to a server a transaction request comprising transaction information for the transaction, the transaction information comprising a security token for the transaction and an account identifier for the transaction, receive, via the one or more network links, a transaction response to the transaction request from the server, the transaction response comprising an indication of a result of a computing analysis performed with the transaction information, and cause dispensing of money, and store one or more serial numbers of the dispensed money based on the indication of the result indicating the transaction is suspicious.

BRIEF DESCRIPTION OF THE DRAWINGS

FIG. 3A/3B/3C illustrate examples of processing flows for a transactional system.

DETAILED DESCRIPTION

Figure 1:
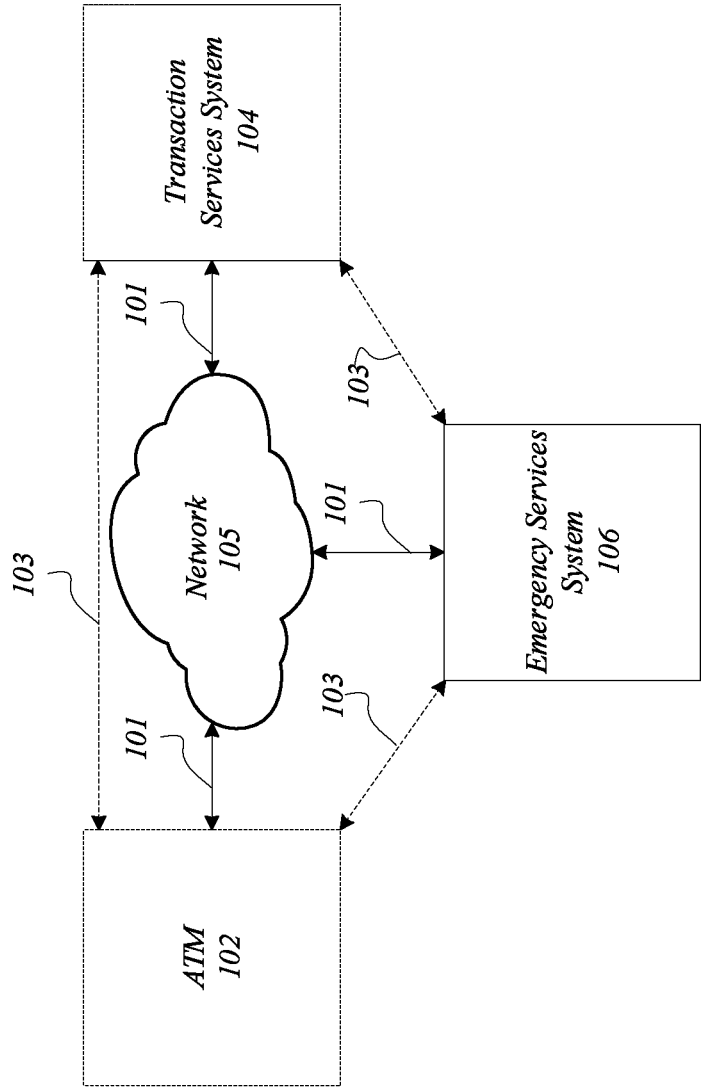
FIG. 1 illustrates an example of a transactional system to process information.

Various embodiments are generally directed to techniques to perform computational analyses to detect suspicious activity surrounding an ATM withdrawal transaction. Embodiments include a transaction processing system to process information and data related to transaction and detect suspicious activity. The transaction processing system may include a number of components and devices, such as a transaction services system, an ATM, and an emergency services system. The ATM may include memory and circuitry to process information and data based on a transaction attempt. In embodiments, the ATM may receive an attempt to perform a transaction and send transaction request including the transaction information to the transaction services system. The transaction services system may process the transaction, e.g., perform a computing analysis, to determine whether there is suspicious activity associated with transaction. The transaction services system may send a transaction response to the ATM including an indication of a result of the computing analysis. Based on the result indicating that suspicious activity is detected, the ATM may dispense money, e.g., cash, with known serial numbers. The ATM and/or the transaction services system may also send an alert to the emergency services system including the known serial numbers.

The ATM is designed to dispense money with known serial numbers to assist law enforcement personal when a suspected fraudulent withdrawal is taken place, for example. ATMs today include multiple "cash drawers" that hold different denominations of cash. In one example, the ATM may include a dedicated drawer to store cash with known serial numbers and to utilize that drawer when the fraudulent withdrawal is detected. In addition to the alert and serial numbers, the ATM may send other information to emergency services system, such as a picture/video of a person making the transaction, a location of the transaction, a time of the transaction, and so forth. Embodiments are not limited to above-discussed example. In some instances, the ATM may perform the computing analysis and detect suspicious activity.

Reference is now made to the drawings, wherein like reference numerals are used to refer to like elements throughout. In the following description, for purpose of explanation, numerous specific details are set forth in order to provide a thorough understanding thereof. It may be evident, however, that the novel embodiments can be practiced without these specific details. In other instances, well known structures and devices are shown in block diagram form to facilitate a description thereof. The intention is to cover all modification, equivalents, and alternatives within the scope of the claims.

FIG. 1 illustrates an example of a transaction processing system 100 that is capable of processing automatic teller machine (ATM) transactions and detecting suspicious activity associated with transactions. The transaction processing system 100 may also perform remedial actions based on a detection of the suspicious activity. The remedial actions may include dispensing of money with known serial numbers, notifying an emergency services system, requiring two-factor authentication, notifying an account owner associated with the transaction, providing the serial numbers to law enforcement, and so forth. Embodiments are not limited in this manner.

In embodiments, the transaction processing system 100 may include an ATM 102, a transaction services system 104, and an emergency services system 106. These devices and systems may be coupled via one or more interconnects 101. For example, each of the ATM(s) 102, the transaction services system 104, and the emergency services system 106 may be coupled with network 105, e.g., the Internet, via one or more wired and/or wireless network links. In some embodiments, the ATM(s) 102, the transaction services system 104, and the emergency services system 106 may be coupled via dedicated networking links 103, e.g., a point-to-point wireless or wired network, a point-to-point fiber network, telephone network (dial-up modem network), and so forth. Embodiments are not limited in this manner.

In embodiments, the transaction processing system 100 may collect and process data associated with a transaction performed at an ATM 102. For example, the transaction processing system 100 may determine whether a security token entered for a transaction is valid/invalid by comparing the entered security token to a stored valid security token. The transaction processing system 100 may also perform a computing analysis to determine whether activity associated with the transaction is suspicious or not suspicious. The computing analysis may include one or more data analysis techniques, modeling techniques, machine-learning techniques, and so forth to detect suspicious activity. The data analysis techniques include statistical analysis techniques, artificial intelligence techniques, and the application of one or more rules, criteria, settings and so forth to data collected for a transaction included in transaction information. For example, a statistical analysis technique may include performing data preprocessing, comparing transaction information to statistical averages, applying models based on historical transaction information, time-series analysis, clustering techniques, matching algorithm, and so forth.

In one example, the transaction processing system 100 may perform the computing analysis by generating a model from historical transaction information of a general population and comparing current transaction information associated with a transaction to determine whether activity associated with the transaction is outside of the norms predicted by the model. In some instances, the historical transaction information may be limited to general population by location, e.g., an area surrounding an ATM, and/or each specific user. For example, a model may be generated from historical transaction information based on activities previously performed by the user and associated with an account of a user.

In another example, the transaction processing system 100 may perform the computing analysis by analyzing transaction information based on one more rules, criterion, settings, and so forth. For example, the transaction processing system 100 may determine whether a fraud alert has been triggered for the account associated with the transaction, e.g., stolen ATM card reported. Other rules may include suspicious times for a transaction, e.g., 3:00 AM, transaction is outside of 'home' location or location set by the owner of the account, the transaction is for amount above a threshold value, e.g., an amount equal to or greater than $200, and so forth. These rules may be pre-configured for the transaction processing system 100 by a user and/or a computer using model training techniques.

In a third example, the transaction processing system 100 may perform the computing analysis by analyzing transaction information based on calculations of various statistical parameters, such as averages, quantiles, probability distributions, and so forth. For example, an average withdraw amount may be determined for each account owner and suspicious activity alert may be triggered for transaction outside of the average amount. Embodiments are not limited in this manner an average may be determined for any number of values including, but not limited to, a time of transaction, a distance from a home associated with the owner, frequency of a number of transaction within a time period (hour/day/month/etc.), and so forth. The averages for these statistics may be updated on a periodic, semi-periodic, and/or non-periodic, e.g., after each time a user performs a transaction.

In another example, the transaction processing system 100 may perform the computing analysis by performing a biometric analysis on the transaction information. For example, the transaction processing system 100 may detect a fingerprint associated with a transaction, e.g., via a fingerprint reader of the ATM 102, and compare the fingerprint to one or more known valid fingerprints. Other examples include, but are not limited to, analyzing an iris scan captured by a camera of the ATM 102, analyzing a gait captured by the camera of the ATM 102, analyzing a height of a person associated with the transaction, and so forth. The measurement information may be communicated in the transaction information between the systems and components of the transaction processing system 100. Embodiments are not limited to these examples and may include comparing a measured biometric taken at the time of transaction to a known valid biometric of the same type.

The transaction processing system 100 may detect suspicious activity based on the result of the computing analysis, e.g., detection of activity outside of a norm predicted by a model, violation of one or more rules, violation of a statistical average for a data point, failure of a biometric analysis, and so forth. If the result of the computing analysis indicates suspicious activity, the transaction processing system 100 may cause and/perform one or more remedial operations. For example, the transaction processing system 100 may cause money having known serial numbers to be dispensed from the ATM 102, notify an emergency services system 106, notify a device associated with an owner of an account for the transaction, cause two-factor authentication to be performed, and so forth.

In embodiments, the transaction processing system 100 may determine which of the one or remedial operations to perform based on a degree or level of certainty of the result of the computing analysis. In some instances, operations taken by the transaction processing system 100 at each level of certainty may be configurable by the transactions services system 100 and set by a user of the system. In one example, a greater than 90% level of certainty of suspicious activity may cause the transaction services system to dispense money with known serial numbers and send an alert to the emergency services system 106. If the level of certainty of suspicious activity is between 75% and 90%, the transaction processing system 100 may cause two-factor authentication for the transaction to be performed. If the level of certainty is between 50% and 75%, the transaction processing system 100 may send a notification to a device associated with an account for the transaction. If the level of certainty is less than or equal to 50%, the transaction processing system 100 may dispense money without performing any remedial operations. Embodiments are not limited in this manner and the degree or level of certainty and actions performed may be configurable by a user and/or one or more components of the transaction processing system 100

Figure 4:
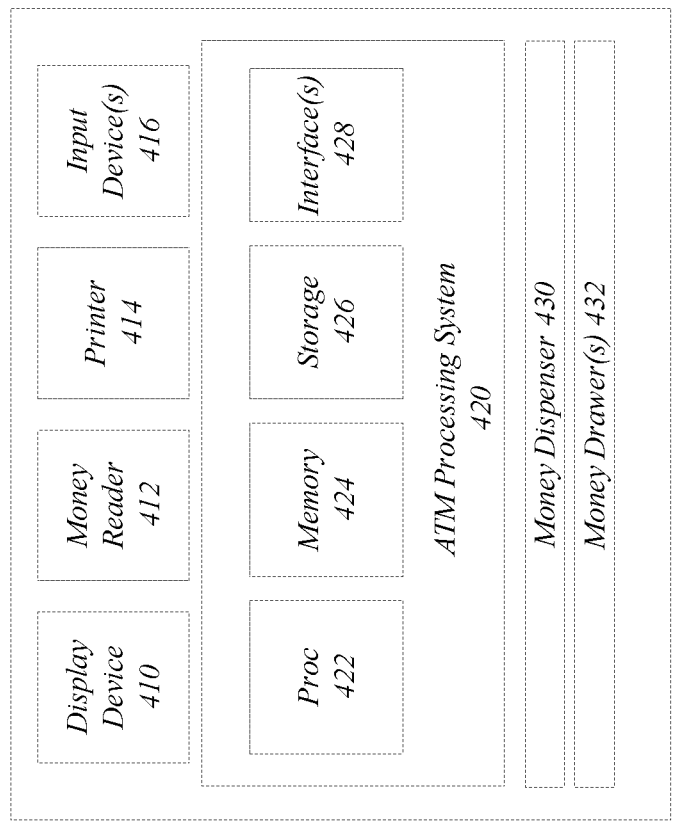
FIG. 4 illustrates an example of an automatic teller machine.

In embodiments, the transaction processing system 100 including the ATM 102 may include a number of components, devices, and so forth, as illustrated in FIG. 4, to perform one or more operations including processing transaction requests and dispensing money, e.g., paper money, cash, coins, etc. in response to the transaction requests. For example, a user may enter an ATM card into the ATM 102 or provide an electronic version or token of an ATM card via a mobile device using wireless technologies such as near field communication (NFC). The user may enter a pin or security token associated with ATM card, via an input device or keypad, to enable one or more transactions options on the ATM 102, e.g., withdraw cash, determine account balances, deposit cash, and so forth. In one example, a user may use an input device to withdraw cash or money from the ATM. Embodiments are not limited in this manner.

The ATM 102 may process and send a transaction request to one or more other systems, e.g., the transaction services system 104. For example, the ATM 102 may communicate transaction information associated with the requested transaction to a transaction services system 104 via an application programming interface (API) call. The transaction information may include information relating to the transaction including, but not limited, a security token, an account identifier, biometric (measurement) information, video/image information, audio information, location information, time information, and so forth. The biometric information may further include a fingerprint sample of a user, a gait video/image of the user, a height image of the user, an audio sample of the user (and surrounding), a facial image of the user, and so forth.

In embodiments, the transaction request including the transaction information may cause one or more operations to be performed by transaction services system 104 including, but not limited to, verifying a security token entered by a user for the transaction and performing a computing analysis detect suspicious activity. For example, the transaction services system 104 may apply one or more of the computing analysis techniques, as previously discussed, to the transaction information for the transaction. Moreover, the transaction services system 104 may communicate a transaction response to the ATM 102 includes a result of the security token analysis and the computing analysis via an API call, for example.

In embodiments, the ATM 102 may receive and process the transaction response communicated in response to the transaction request. The transaction response may include an indication of whether the security credential is valid or invalid and an indication of a result of the computing analysis. The result of the computing analysis may indicate whether suspicious activity is detected or not detected. The ATM 102 may perform one or more operations based on the indications of the security credential and the result of the computing analysis.

In embodiments, the ATM 102 may dispense money in response to an indication that the security credential is valid, the amount may be an amount requested by a user. However, in response to an indication that the security credential is invalid, the ATM 102 may reject or decline the transaction. Note that in some instances, the ATM 102 may receive a transaction response indicating that the security credential is valid, but suspicious activity is detected. In these instances, the ATM 102 may perform one or more remedial actions including dispensing money with a known serial number. For example, the ATM 102 may include a drawer of money with known serial numbers and select money from the drawer to provide to the user. In other instances, the ATM 102 may include a scanning device or bill reader and may read the serial numbers of money as they are being dispensed and/or right before being dispensed (counted), e.g., performing a scan operation. The serial numbers scanned may be stored in memory or storage and provided to law enforcement personal.

In embodiments, the ATM 102 may send an alert to an emergency services system 106 to notify emergency services personnel of the suspicious activity. However, in other instances, the transaction services system 104 may provide the alert to the emergency services system 106 based on the result of the computing analysis. Note that in these instances, the ATM 102 may communicate information, such as the one or more known serial numbers dispensed by the ATM 102 back to the transaction services system 104 to send in the alert. In other instances, the transaction services system 104 may know the serial numbers of the dispensed money based on a pre-configuration, e.g., the serial numbers are known. Moreover, the alert, communicated by the ATM 102 and/or the transaction services system 104, may include information, such as a location of the ATM, an image of the user, the serial number of a bill of money, a time of the transaction, a description of the suspicious activity, and so forth. The information may be used by the emergency services personnel to investigate the suspicious activity.

In some instances, the ATM 102 may perform at least a portion of the computing analysis to detect suspicious activity. The ATM 102 including processing circuitry collects the transaction information and applies one or more of a model to the transaction information and/or applying one or more data analysis techniques to the transaction information. If suspicious activity is detected by the ATM 102, the ATM 102 may send the alert to the emergency services system 106 based on its determination.

In embodiments, transaction processing system 100 includes a transaction services system 104, which includes one or more computing devices, e.g., servers that are capable of processing information and data. In embodiments, the transaction services system 104 may utilize a cloud-based computing architecture and/or a distributed computing architecture. In other words, one or more of the computing devices may be distributed in different locations and connected by a computing network. The computing devices may communicate data and messages between each other to process data to achieve a common goal. These messages may be passed using protocols, such as the Hypertext Transfer Protocol (HTTP), secure HTTP, remote procedure call (RPC) connectors, message queues, and so forth. In some instances, these computing devices may be part of a cloud computing architecture and resources of the computing devices may be shared to perform a number of different tasks. The computing device's resources may be among a shared resource pool and rapidly provisioned and re-provisioned to process data on demand.

In embodiments, the transaction services system 104 may perform a number of operations to detect suspicious activity occurring at an ATM. For example, the transaction services system 104 may receive a transaction request having transaction information relating to a transaction at the ATM 102. The transaction services system 104 may perform one or more operations utilizing the transaction information including validating a security token and/or determining whether a user of the ATM 102 is suspicious and/or suspicious activity is occurring. For example, the transaction services system 104 may apply one or more of the computing analyses techniques, as previously discussed, to the transaction information for the transaction. The transaction services system 104 may generate a result based on the one or more computing analyses. The result may indicate whether suspicious activity is detected or not detected by the transaction services system 104.

The transaction services system 104 may communicate a result of the security token validation operation and a result of the computing analysis to the ATM 102 via transaction response messages. In embodiments, the transaction response may cause the ATM 102 to perform one or more operations, as previously discussed, e.g., dispense money with known serial numbers, notify the emergency services system 106, communicate information back to the transaction services system 104, and so forth.

In some instances, the transaction service system 104 may send an alert to an emergency services system 106 to notify emergency services personnel of the suspicious activity. In embodiments, the transaction services system 104 may provide transaction information in the alert. For example, the alert may include biometric information, video/image information, audio information, locale information, time information, and so forth. The biometric information may further include a fingerprint of a user, a gait video/image of the user, a height image of the user, an audio sample of the user (and surrounding), a facial image of the user, and so forth. The transaction services system 104 may also include one or more serial numbers of the known serial numbers dispensed by the ATM 102. In embodiments, the transaction services system 104 communicate with the ATM 102 to determine the serial numbers dispensed and/or the serial numbers may already have been known, e.g., determined prior to the current transaction.

In embodiments, the transaction processing system 100 includes an emergency services system 106 to process data including alerts generated based on detected suspicious activity. The emergency services system 106 includes a number of components to process alerts including processing circuitry and memory. For example, the emergency services system 106 includes one or more computing devices, e.g., servers that are capable of processing information and data. Moreover, the emergency services system 106 may utilize a cloud-based computing architecture and/or a distributed computing architecture.

In embodiments, the emergency services system 106 may receive an alert from one or more of an ATM 102 and the transaction services system 104. The alert may include information and data for a transaction that is associated with suspicious activity. The emergency services system 106 may process the data and cause one or more remedial operations to occur. For example, the emergency services system 106 may cause emergency services personnel to dispatch to the location of the ATM 102 where the suspicious activity occurred. The emergency services system 106 may store the information associated and received with the alert in one or more storage or database systems.

Figure 2A:
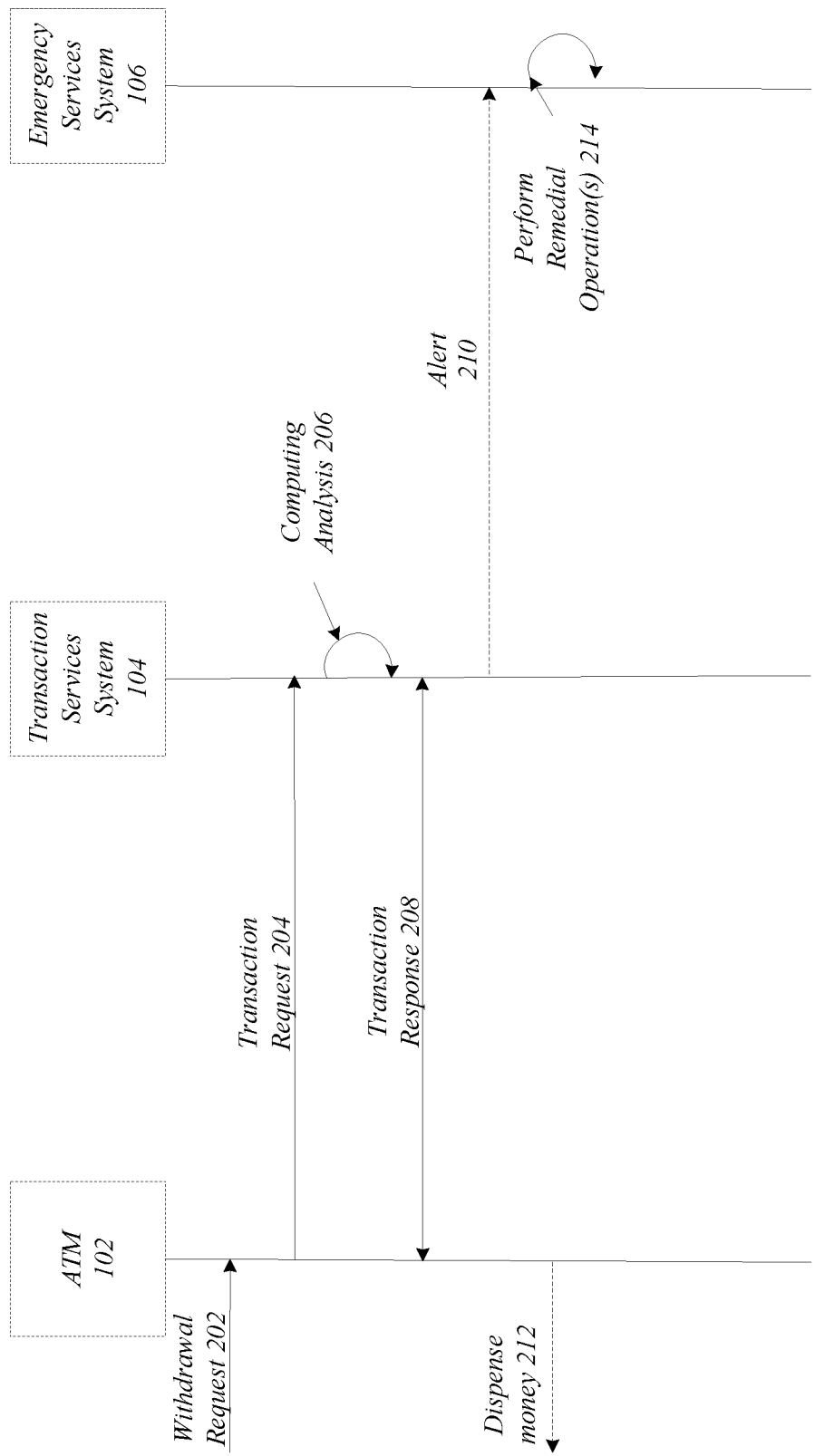
FIG. 2A illustrates an example of a first sequence flow for a transactional system and components.

FIG. 2A illustrates an example operations sequence 200 of one or more operations that may be performed to process a transaction and perform suspicious activity detection. In the illustrated example, one or more messages may be communicated between components of a financial processing system including an ATM 102, the transaction services system 104, and the emergency services system 106.

At line 202, the ATM 102 may receive a withdraw request to perform a transaction. The withdraw request may be associated with a user or banking account, a security token, an amount to withdraw, and so forth. For example, a user may attempt to access an account via the ATM 102 by swiping an ATM card, entering a pin or security token, and select an operation to withdraw money including entering an amount of money. At line 204, the ATM 102 may send a transaction request to a transaction services system 104. The transaction request may include transaction information associated with the transaction attempted to be performed by a user of the ATM 102.

At line 206, the transaction services system 104 may perform a computing analysis, one or more of a data analysis, a biometric analysis, machine learning analysis, and so forth to determine if suspicious activity is occurring for the transaction, e.g., a user is attempting to withdraw money with a stolen debit card. The transaction services system 104 in performing the computing analysis may utilize the transaction information received from the ATM 102 and additional information that can be gathered based on the account, e.g., determining whether a fraud alert is set for the account.

At line 208, the transaction services system 104 may send a transaction response to the ATM 102. The transaction response may include an indication of whether a security token is valid and an indication as to whether the suspicious activity is detected by the transaction services system 104. The transaction services system 104 may also send an alert to an emergency services system 106 based on the result of the computing analyses at line 210. The alert may notify emergency services personnel of the suspicious activity and include information associated with the transaction, e.g. the transaction information, a location of the transaction, a video, an audio, one or more serial numbers dispensed for the transaction, and so forth.

At line 212, the ATM 102 may dispense money in an amount requested by a user. In some instances, e.g., if suspicious activity is detected, the ATM 102 may dispense at least at least one bill of money with a known serial number. For example, the ATM 102 may select the bill from a drawer having money with known serial numbers. In another example, the ATM 102 may read one or more serial numbers on the money tokens as they are being dispensed and store the serial numbers in memory. The ATM 102 may communicate the known serial numbers to the emergency services system 106 or via the transaction service system 104.

At line 214, the emergency services system 106 may perform one or more remedial operations. For example, emergency services system 106 may dispatch an emergency service personnel to the location of the transaction. In other instances, the emergency services system 106 send the information a user and the user may determine to send the emergency services system 106. The emergency services system 106 and/or transaction services system 104 may store the data associated with the suspicious activity in storage system and/or database for future, e.g., building a case, filing a police report, and so forth. Embodiments are not limited in this manner.

Figure 2B:
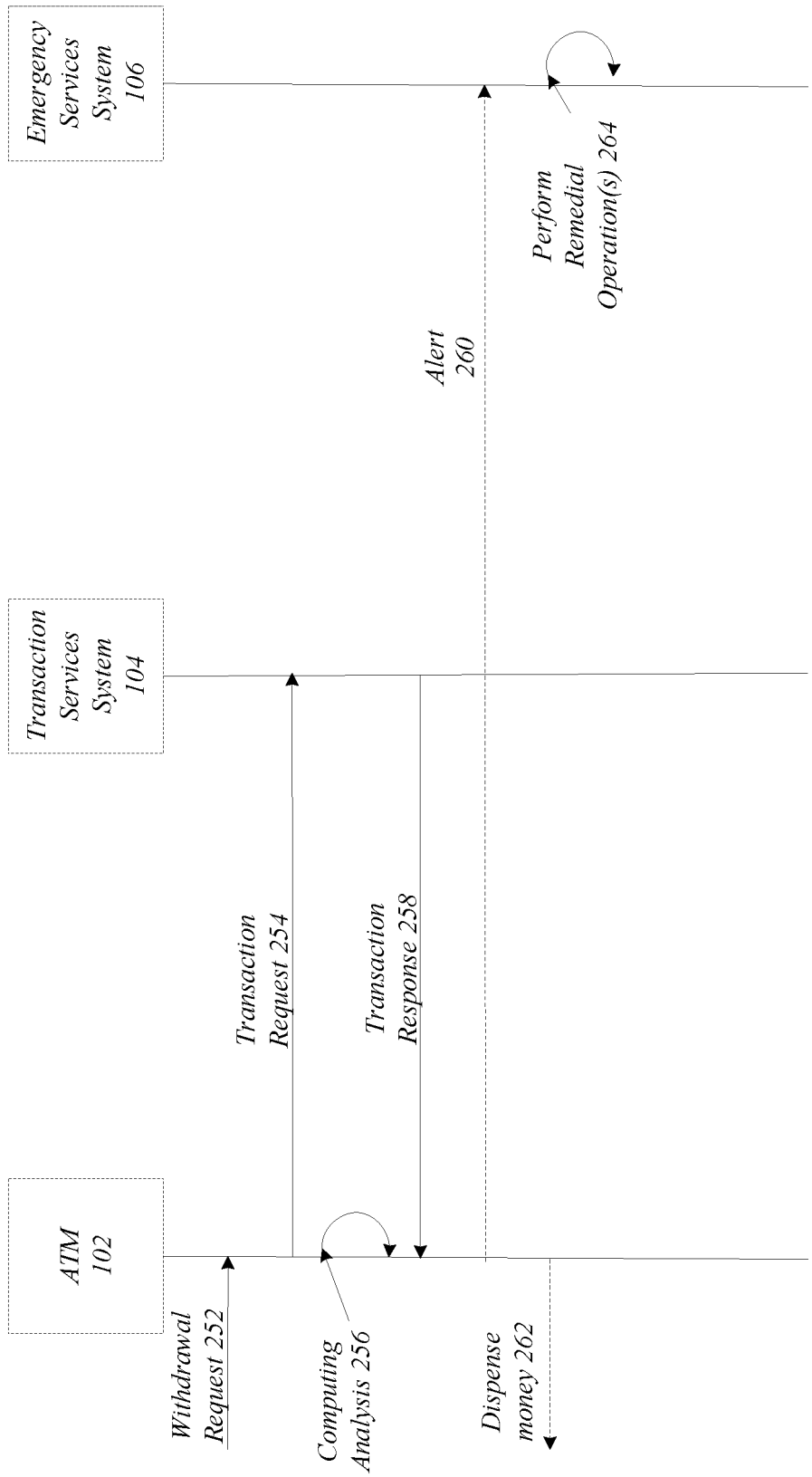
FIG. 2B illustrates an example of a second sequence flow for a transactional system and components.

FIG. 2B illustrates an example operations sequence 250 of one or more operations that may be performed to process a transaction and perform suspicious activity detection. In the illustrated example, one or more messages may be communicated between components of a financial processing system including an ATM 102, the transaction services system 104, and the emergency services system 106. The operations sequence 250 is similar to operations sequence 200; however, in the illustrated example, operations sequence 250 includes the ATM 102 performing at least a portion of the computing analysis to determine whether suspicious activity is associated with a transaction.

At line 252, the ATM 102 may receive a withdraw request to perform a transaction, and at line 254 the ATM 102 may send a transaction request to a transaction services system 104. The transaction request may include transaction information associated with the transaction, as previously discussed. In embodiments, the transaction services system 104 may process in the transaction information including validating the security token entered by the user to request the withdraw. At line 258, the transaction services system 104 may send a transaction response to the ATM 102. The transaction response may indicate whether the security token is valid or invalid.

At line 256, the ATM 102 may perform a computing analysis to determine whether suspicious activity is associated with the transaction. For example, the ATM 102 may apply one or more of a data analysis, a machine learning analysis, a biometric analysis, and so forth to the transaction information. Note that in some instances, the computing analysis may partially be performed by the transaction services system 104 and partially by the ATM 102. For example, the ATM 102 may apply a data analysis to the transaction information, e.g., comparing against one or more rules, and the transaction services system 104 may apply a machine learning analysis, e.g., comparing the transaction information to a predicted model. Embodiments are not limited to these examples.

In embodiments, the ATM 102, at line optional 260, may send an alert to an emergency services system 106 based on the result of the computing analysis indicating that suspicious activity is detected. The alert may notify emergency services personnel of the suspicious activity and include information associated with the t, transaction, e.g., the transaction information, a location of the transaction, a video, an audio, one or more serial numbers dispensed for the transaction, and so forth. In embodiments, the ATM 102 may send the alert based on the computing analysis performed by the ATM 102 or the combination of the computing analysis performed by the ATM 102 and the transaction services system 104.

At line 262, the ATM 102 may dispense money in an amount requested by a user. In some instances, e.g., when suspicious activity is detected, the ATM 102 may dispense at least one bill with a known serial number. The ATM 102 may communicate the known serial number to the transaction services system 104 to send to the transaction service system 104 or directly to the emergency services system 106. At line 264, the emergency services system 106 may perform one or more remedial operations, e.g., dispatch a police officer, log the transaction information, etc.

FIG. 3A illustrates an example of a logic flow 300 that may be representative of some or all of the operations executed by one or more embodiments described herein. For example, the logic flow 300 may illustrate operations performed by a transaction processing system to detect suspicious activity.

At block 305, the logic flow 300 may include receiving from an automatic teller machine (ATM) a transaction request including transaction information for a transaction to withdraw money. For example, a transaction services system may receive a transaction request including transaction information. The transaction services system may utilize the transaction information to determine whether a security token is valid and whether suspicious activity is associated with the transaction.

At block 310, embodiments include performing a computing analysis utilizing the transaction information to determine whether the transaction is suspicious or not suspicious. The computing analysis includes at least one of applying one or more factors to the transaction information and applying a model to the transaction information. For example, the transaction services system may perform a data analysis and analyze the transaction in view of one or more factors including, but not limited to, a fraud alert setting for the transaction, a location of the transaction, a number of incorrect security identifiers entered for the transaction, one or more biometric factors for the transaction, a time for the transaction, a number of attempts to perform a transaction within a specified time period, and so forth. In some instances, the computing analysis may include analyzing the transaction information in view of a combination of the factors.

In another example, the transaction services system may apply a model to the transaction information. The model may be trained on historical transaction data associated with historical transactions. In some instances, the historical transaction data is limited to the user and account associated with the transaction. The transaction services system may utilize the model to determine whether data provided in the transaction information is outside a predicted normal activity. In some instances, the model may be trained on historical transaction information of a general population of prior users of ATMs. In other instances, the model may be trained on historical transaction information of a specific user, e.g., the user associated with the account for the transaction. Embodiments are not limited in this manner. For example, the transaction services system may perform additional and/or alternative computing analysis, e.g., a biometric analysis based on biometric information included in the transaction information.

In embodiments, the transaction services system may perform the computing analysis as combination of a data analysis, model analysis, machine-learning analysis, biometric analysis, and so forth. For example, the determination of whether there is suspicious activity may be based on a result of a combination of analyses.

In embodiments, the transaction services system may determine whether activity associated with the transaction is suspicious or not suspicious based on the computing analysis and communicate the result to the ATM. For example, the transaction services system may determine activity is suspicious if one or more factors are met, e.g., a fraud alert is set, the locale of the transaction is occurring a threshold value range outside of a normal location range, a number of attempts of a security token entry exceeded a threshold attempt value, one or more biometric factors failed, a number of attempts to perform a transaction exceed a threshold value within a period of time, and/or a combination thereof.

At block 315, the logic flow 300 includes sending a transaction response to the ATM and in response to the transaction request. The transaction response may include an indication of a result of the computing analysis. For example, the transaction response may indicate whether the computing analysis resulted in suspicious activity detection or not. In one example, the transaction processing system may utilize one or more bits of the transaction response to indicate the result. For example, one bit corresponding to the suspicious activity result may be set if suspicious activity is detected or not set if suspicious activity is not detected. In other instances, the transaction response may include contextual information with the result of the computing analysis. The contextual information may indicate a percentage likelihood that the suspicious activity detected is a fraud attempt, for example. Based on the result of the computing analysis indicating that suspicious activity is detected, the ATM may dispense the money, and store one or more serial numbers of the dispensed money. In some instances, the ATM may notify an emergency services system if suspicious activity. However, in other instances, the transaction services system may notify the emergency services system of suspicious activity. If suspicious activity is not detected, the ATM may dispense the money, which may or may not include money with known serial numbers. For example, if the ATM is getting low on money, the ATM may dispense and money from a drawer holding money with known serial numbers.

FIG. 3B illustrates an example of a logic flow 340 that may be representative of some or all of the operations executed by one or more embodiments described herein. For example, the logic flow 340 may illustrate operations performed by an ATM to process a transaction request and detect suspicious activity.

At block 345, the logic flow 340 may include receiving a request to perform a transaction to withdraw money. In embodiments, the ATM may include one or more sensors and/or input devices to collect information and data relating to the transaction, e.g., transaction information. As will be discussed in more detail below, these input device and sensors may include but are not limited to, a keypad, a card reader, a biometric sensor, a microphone, a camera, and so forth. The ATM may collect the transaction information and communicate with a transaction services system to perform the transaction, e.g., dispense money.

In embodiments, the ATM may use the transaction information to detect suspicious activity. More specifically and at block 350, the logic flow includes performing a computing analysis utilizing transaction information associated with the transaction to determine if the transaction is suspicious. The computing analysis may include at least one of applying one or more factors to the transaction information and applying a model to the transaction information. The computing analysis may include one or more of a data analysis, a model analysis, a biometric analysis, a machine-learning analysis, and so forth. Based on a result of the computing analysis, the ATM may determine whether suspicious activity is detected or not detected for the transaction.

In embodiments and at block 355, the logic flow 340 includes causing dispensing of the money, and store one or more serial numbers of the money in response to determining the transaction is suspicious. In some instances, the ATM may notify an emergency services system if suspicious activity. If suspicious activity is not detected, the ATM may dispense the money, which may or may not include money with known serial numbers. For example, if the ATM is getting low on money, the ATM may dispense and money from a drawer holding money with known serial numbers.

FIG. 3C illustrates an example of a logic flow 370 that may be representative of some or all of the operations executed by one or more embodiments described herein. For example, the logic flow 370 may illustrate operations performed by an ATM to process a transaction request. In the illustrated example, a transaction services system may process transaction information relating to the transaction request and determine if there is suspicious activity.

At block 375, the logic flow 370 may include receiving a request to perform a transaction to withdraw money. In embodiments, the ATM may include one or more sensors and/or input devices to collect information and data relating to the transaction, e.g., transaction information. As will be discussed in more detail below, these input device and sensors may include but are not limited to, a keypad, a card reader, a biometric sensor, a microphone, a camera, and so forth. The ATM may collect the transaction information and communicate with a transaction services system to perform the transaction, e.g., dispense money.

In embodiments, at block 380, the logic flow 370 includes sending a server a transaction request including transaction information for the transaction. The server may be part of a transaction services system and the transaction information may include information relating to the transaction including a security token for the transaction and an account identifier for the transaction. In some embodiments, the transaction information may include additional information relating to the transaction, e.g., data and information collected by one or more sensors and/or input devices that may be used to perform a computing analysis.

At block 385, the logic flow 370 includes receiving, via the one or more network links, a transaction response to the transaction request from the server, the transaction response comprising an indication of a result of a computing analysis performed with the transaction information. The indication of the result may indicate whether suspicious activity is detected or not detected. Further, the logic flow 370 includes causing dispensing of the money, and store one or more serial numbers of the money based on the indication of the result indicating the transaction is suspicious at block 390. In embodiments, the ATM may dispense a bill having a known serial number from a drawer including money with known serial numbers. In another example, the ATM may include a reading device and read the serial number as a bill is being prepared to be dispensed.

FIG. 4 illustrates an example of an ATM 402 that is consistent with embodiments discussed herein. The ATM 402 may include a number of components and devices to provide various functionality for the ATM 402 including processing transactions and performing suspicious activity detection.

In embodiments, the ATM 402 includes a display device 410 capable of displaying information to a user and one or more input device(s) 416 that may enable the user to interact with the ATM 402. The display device 410 may be any type of display device including, but not limited to, a CRT display, a LCD display, a plasma display, and so forth. Further, the one or more input device(s) 416 may include a keypad to enable a user to enter information corresponding to a transaction, e.g., a security token (pin). The keypad may include numbers and additional keys, such as "ENTER", "CANCEL", and so forth.

In some embodiments, the one or more input device(s) 416 may include a camera to capture video/image information, a microphone to capture audio information, and one or more biometric sensors. Example biometric sensors may include an iris scanning device, a fingerprint scanning device, and so forth. In some instances, the camera and/or microphone may capture information that may be used for biometrics, e.g., facial recognition, voice recognition, gait/height recognition, and so forth.

In embodiments, the ATM 402 includes a money reader 412 that is capable of reading information from money as they are being dispensed and/or while in the ATM 402 itself. The money reader 412 may include an optical scanning device that is capable of reading information or perform a scan operation, such as scanning a serial number, on the money to determine a known serial number. The ATM 402 also includes a printer 414 to print receipts.

In embodiments, the ATM 402 includes an ATM processing system 420 including a processor 422, memory 424, storage 426, and one or more interface(s) 428. The processor 422 may be any type of processing device capable of processing information and data, such as a central processor unit (CPU), processing circuitry, and so forth capable of processing software, information, and data to perform one or more operations discussed herein.

The memory 424 may be volatile and/or non-volatile memory capable of storing information during execution of instructions and/or in a persistent manner when power is not applied to the 402. For example, the memory 424 may include read-only (or programmable) read-only memory capable of storing instructions that when executed by the processor 422 cause one or more operations as discussed herein. The ATM 402 may also include a storage device 426, such as a hard drive (HDD), a tape drive, and so forth also capable of storing information in a persistent manner.

The ATM processing system 420 also includes one or more interface(s) 428 that are capable of interfacing with one or more other system, such as a financial services system and/or an emergency services system. These interfaces may couple to a local area network (LAN), a wide area network (WAN), and/or provide a dial-up connection capability. For example, the interfaces 428 can include a wired and/or wireless networking interface having a high bandwidth network connection to allow for efficient and rapid communication of information and data and may use the TCP/IP transfer protocol. In another example, the interfaces 428 may include a dial-up modem to communicate via dial-up connection.

The ATM 402 also includes a money dispenser 430 capable of dispensing money. In some embodiments, the money dispenser 430 may include the scanning device capable of reading serial numbers of the money when performing a scanning operation. However, embodiments are not limited in this manner and the money reader 412 may be located in a different portion of the ATM 402. The ATM 402 also includes one or more money drawer(s) 432. In one example, at least one of the money drawers 432 may be loaded with money with known serial numbers. Thus, the ATM 402 may dispense the money from the drawer with known serial numbers when suspicious activity is detected. The drawer may be preloaded with money with known serial numbers, for example.

Figure 5B:
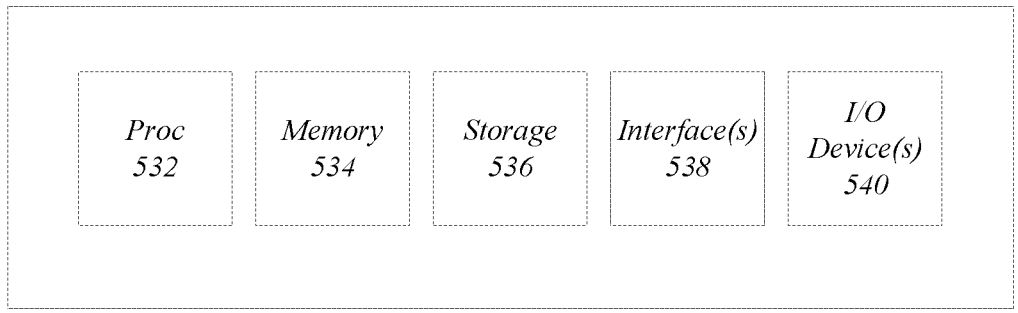
FIG. 5B illustrates an example of an emergency services system.
Figure 5A:
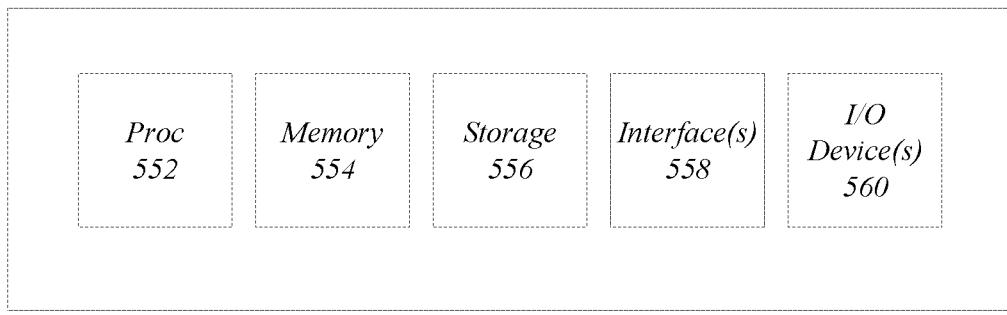
FIG. 5A illustrates an example of a transaction services system.

FIGS. 5A/5B illustrated examples of a transaction services system 504 and an emergency services system 506, respectively. The transaction services system 504 and the emergency services system 506 include a number of components that may perform one or more operations as discussed herein. The transaction services system 504 includes one or more processors 552, memory 554, storage 556, one or more interface(s) 558, and one or more input/output (I/O) device(s) 560. Similarly, the emergency services system 506 includes one or more processor(s) 532, memory 534, storage 536, one or more interface(s) 538, and one or more I/O device(s) 540.

In embodiments, the transaction services system 504 may be a processing system that includes one or more servers or computing devices that are interconnected via one or more network links, e.g., wired, wireless, fiber, etc. In some instances, the transaction services system may be a distributed computing system. Each of the servers may include one or more processor(s) 552, which may include one or more processing cores to process information and data. Moreover, the one or more processors 552 can include one or more processing devices, such as a microprocessor manufactured by Intel™, AMD™, or any of various processors. The disclosed embodiments are not limited to any type of processor(s).

Memory 554 can include one or more memory (volatile or non-volatile) devices configured to store instructions used by the one or more processors 552 to perform one or more operations consistent with the disclosed embodiments. For example, memory 554 can be configured with one or more software instructions, such as programs that can perform one or more operations when executed by the one or more processors 552.

The disclosed embodiments are not limited to separate programs or computers configured to perform dedicated tasks. For example, memory 554 can include a single program that performs the operations or could comprise multiple programs. Memory 554 can also store data that can reflect any type of information in any format that the system can use to perform operations consistent with the disclosed embodiments.

In embodiments, the transaction services system 504 may include one or more storage devices 556. The storage devices 556 may include HDDs, flash memory devices, optical storage devices, floppy storage devices, etc. In some instances, the storage devices 556 may include cloud-based storage devices that may be accessed via a network interface. In some embodiments, the storage 556 may be configured to store one or more databases and/or as a distributed database system to store information and data. Databases can include one or more memory devices that store information and are accessed and/or managed through the transaction services system 504. By way of example, databases can include Oracle™ databases, Sybase™ databases, or other relational databases or non-relational databases, such as Hadoop sequence files, HBase, or Cassandra. The databases or other files can include, for example, data and information related to the source and destination of a network request, the data contained in the request, transaction information, etc. Systems and methods of disclosed embodiments, however, are not limited to separate databases. In one aspect, transaction services system 504 can include databases located remotely from other transaction services system 504 devices. The databases can include computing components (e.g., database management system, database server, etc.) configured to receive and process requests for data stored in memory devices of databases and to provide data from databases.

The transaction services system 504 includes one or more interfaces 558. The one or more interfaces 558 can include one or more digital and/or analog communication devices that allow the transaction services system 504 to communicate with other machines and devices, such one or more ATMs and emergency services systems. The one or more interfaces 558 are capable of communicating via any type of connection, e.g., wired, wireless, optical, and so forth. These interfaces 558 may include network adapters and/or modems to communicate with the ATMs and the Emergency services systems. Embodiments are not limited in this manner.

The transaction services system 504 may also include one or more I/O devices 560, such as a mouse, keyboard, camera, microphone, etc. Other I/O devices may include USB devices, CD/DVD/Blu-ray devices, SD card devices, display devices, and so forth.

In embodiments, the emergency services system 506 of FIG. 5B includes similar devices as the transaction services system 504. As mentioned, the emergency services system 506 includes one or more processors 532, memory 534, storage 536, interfaces 538, and I/O devices 540. The emergency services 506 may be a processing system that includes one or more servers or computing devices that are interconnected via one or more networking links, e.g., wired, wireless, fiber, etc. and is capable of processing information and data from the transaction services system and ATMs. In some instances, the emergency services system 506 may also be a distributed computing system. Each of the servers may include one or more processor(s) 532, which may include one or more processing cores to process information and data. The emergency services system 506 also includes memory 534, which may be similar to and/or the same as memory 554. Memory 534 can include one or more memory (volatile or non-volatile) devices configured to store instructions used by the one or more processors 532 to perform one or more operations consistent with the disclosed embodiments.

In embodiments, the emergency services system 506 may include one or more storage devices 536. The storage devices 536 may include HDDs, flash memory devices, optical storage devices, floppy storage devices, etc. In some instances, the storage devices 536 may include cloud-based storage devices that may be accessed via a network interface. In some embodiments, the storage 536 may be configured to store one or more databases and/or as a distributed database system to store information and data.

The transaction services system 506 includes one or more interfaces 538. The one or more interfaces 538 can include one or more digital and/or analog communication devices that allow the emergency services system 506 communicate with other machines and devices, such one or more ATMs and emergency services systems. The one or more interfaces 538 are capable of communicating via any type of connection, e.g., wired, wireless, optical, and so forth. These interfaces 538 may include network adapters and/or modems to communicate with the ATMs and the Emergency services systems. Embodiments are not limited in this manner.

The emergency services system 506 may also include one or more I/O devices 540, such as a mouse, keyboard, camera, microphone, etc. Other I/O devices may include USB devices, CD/DVD/Blu-ray devices, SD card devices, display devices, and so forth.

Figure 6:
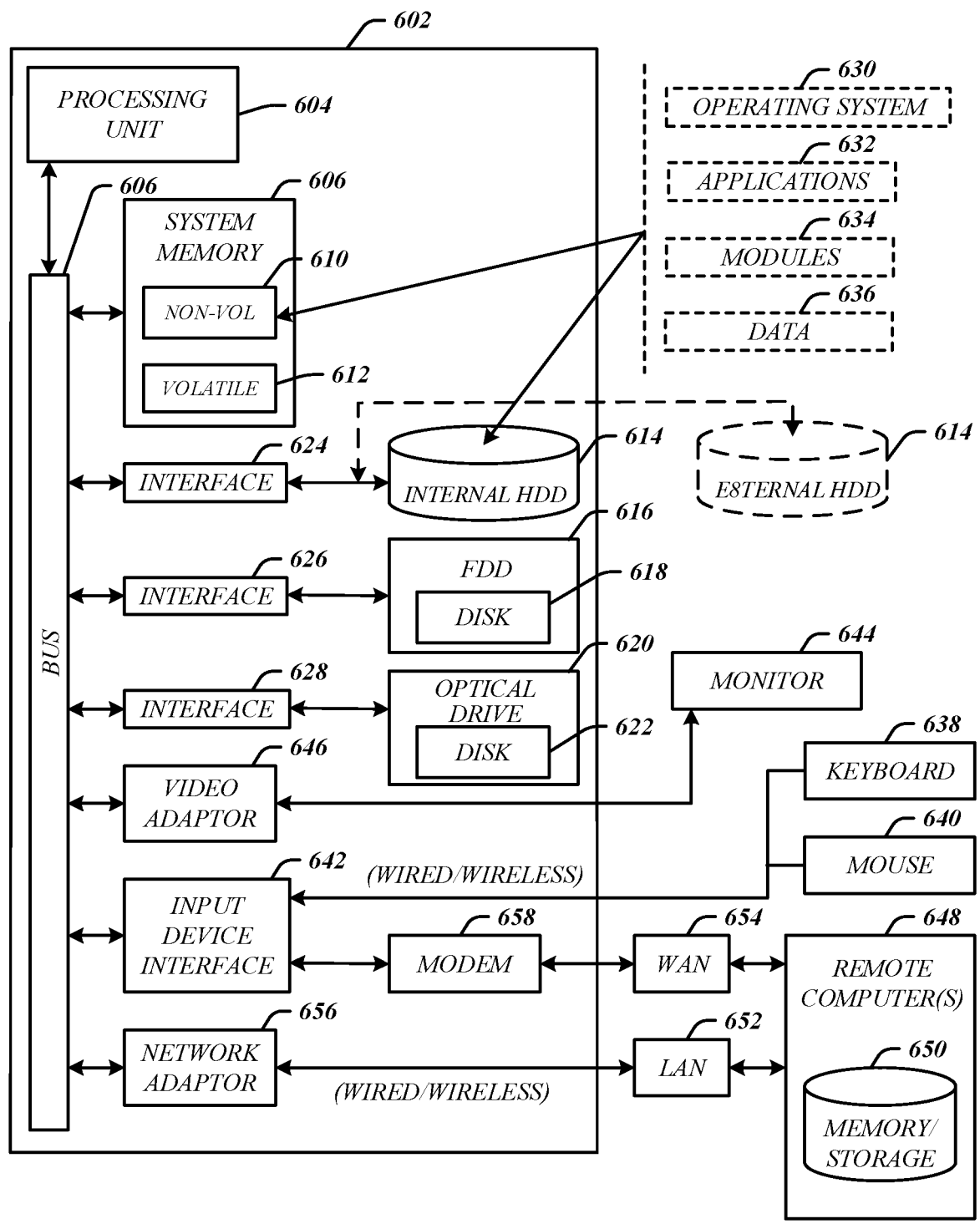
FIG. 6 illustrates an embodiment of a computing architecture.

FIG. 6 illustrates an embodiment of an exemplary computing architecture 600 suitable for implementing various embodiments as previously described. In one embodiment, the computing architecture 600 may include or be implemented as part of system 100.

As used in this application, the terms "system" and "component" are intended to refer to a computer-related entity, either hardware, a combination of hardware and software, software, or software in execution, examples of which are provided by the exemplary computing architecture 600. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 600 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 600.

As shown in FIG. 6, the computing architecture 600 includes a processing unit 604, a system memory 606 and a system bus 608. The processing unit 604 can be any of various commercially available processors.

The system bus 608 provides an interface for system components including, but not limited to, the system memory 606 to the processing unit 604. The system bus 608 can be any of several types of bus structure that may further interconnect to a memory bus (with or without a memory controller), a peripheral bus, and a local bus using any of a variety of commercially available bus architectures. Interface adapters may connect to the system bus 608 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 600 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 606 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 6, the system memory 606 can include non-volatile memory 610 and/or volatile memory 612. A basic input/output system (BIOS) can be stored in the non-volatile memory 610.

The computer 602 may include various types of computer-readable storage media in the form of one or more lower speed memory units, including an internal (or external) hard disk drive (HDD) 614, a magnetic floppy disk drive (FDD) 616 to read from or write to a removable magnetic disk 618, and an optical disk drive 620 to read from or write to a removable optical disk 622 (e.g., a CD-ROM or DVD). The HDD 614, FDD 616 and optical disk drive 620 can be connected to the system bus 608 by a HDD interface 624, an FDD interface 626 and an optical drive interface 628, respectively. The HDD interface 624 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 610, 612, including an operating system 630, one or more application programs 632, other program modules 634, and program data 636. In one embodiment, the one or more application programs 632, other program modules 634, and program data 636 can include, for example, the various applications and/or components of the system 700.

A user can enter commands and information into the computer 602 through one or more wire/wireless input devices, for example, a keyboard 638 and a pointing device, such as a mouse 640. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processing unit 604 through an input device interface 642 that is coupled to the system bus 608 but can be connected by other interfaces such as a parallel port, IEEE 1394 serial port, a game port, a USB port, an IR interface, and so forth.

A monitor 644 or other type of display device is also connected to the system bus 608 via an interface, such as a video adaptor 646. The monitor 644 may be internal or external to the computer 602. In addition to the monitor 644, a computer typically includes other peripheral output devices, such as speakers, printers, and so forth.

The computer 602 may operate in a networked environment using logical connections via wire and/or wireless communications to one or more remote computers, such as a remote computer 648. The remote computer 648 can be a workstation, a server computer, a router, a personal computer, portable computer, microprocessor-based entertainment appliance, a peer device or other common network node, and typically includes many or all the elements described relative to the computer 602, although, for purposes of brevity, only a memory/storage device 650 is illustrated. The logical connections depicted include wire/wireless connectivity to a local area network (LAN) 652 and/or larger networks, for example, a wide area network (WAN) 654. Such LAN and WAN networking environments are commonplace in offices and companies, and facilitate enterprise-wide computer networks, such as intranets, all of which may connect to a global communications network, for example, the Internet.

When used in a LAN networking environment, the computer 602 is connected to the LAN 652 through a wire and/or wireless communication network interface or adaptor 656. The adaptor 656 can facilitate wire and/or wireless communications to the LAN 652, which may also include a wireless access point disposed thereon for communicating with the wireless functionality of the adaptor 656.

When used in a WAN networking environment, the computer 602 can include a modem 658, or is connected to a communications server on the WAN 654 or has other means for establishing communications over the WAN 654, such as by way of the Internet. The modem 658, which can be internal or external and a wire and/or wireless device, connects to the system bus 608 via the input device interface 642. In a networked environment, program modules depicted relative to the computer 602, or portions thereof, can be stored in the remote memory/storage device 650. It will be appreciated that the network connections shown are exemplary and other means of establishing a communications link between the computers can be used.

The computer 602 is operable to communicate with wire and wireless devices or entities using the IEEE 602 family of standards, such as wireless devices operatively disposed in wireless communication (e.g., IEEE 602.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 602.118 (a, b, g, n, etc.) to provide secure, reliable, fast wireless connectivity. A Wi-Fi network can be used to connect computers to each other, to the Internet, and to wire networks (which use IEEE 602.3-related media and functions).

Figure 7:
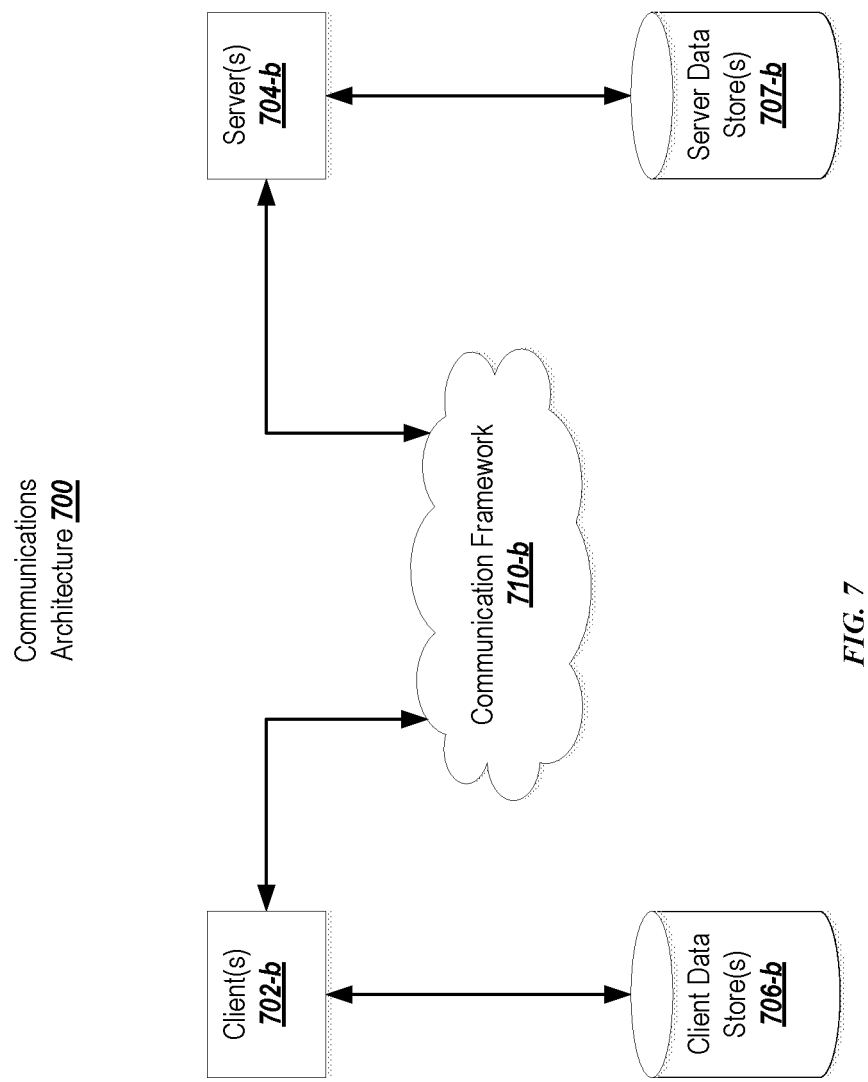
FIG. 7 illustrates an embodiment of a communications architecture.

The various elements of the devices as previously described with reference to FIGS. 1-5 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. FIG. 7 is a block diagram depicting an exemplary communications architecture 700 suitable for implementing various embodiments as previously described. The communications architecture 700 includes various common communications elements, such as a transmitter, receiver, transceiver, radio, network interface, baseband processor, antenna, amplifiers, filters, power supplies, and so forth. The embodiments, however, are not limited to implementation by the communications architecture 700, which may be consistent with system 100.

As shown in FIG. 7, the communications architecture 700 includes one or more clients 702 and servers 704. The servers 704 may implement the server device 526. The clients 702 and the servers 704 are operatively connected to one or more respective client data stores 706 and server data stores 707 that can be employed to store information local to the respective clients 702 and servers 704, such as cookies and/or associated contextual information.

The clients 702 and the servers 704 may communicate information between each other using a communication framework 710. The communications framework 710 may implement any well-known communications techniques and protocols. The communications framework 710 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 710 may implement various network interfaces arranged to accept, communicate, and connect to a communications network. A network interface may be regarded as a specialized form of an input/output (I/O) interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 702.7a-x network interfaces, IEEE 702.16 network interfaces, IEEE 702.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 702 and the servers 704. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

Figure 8:
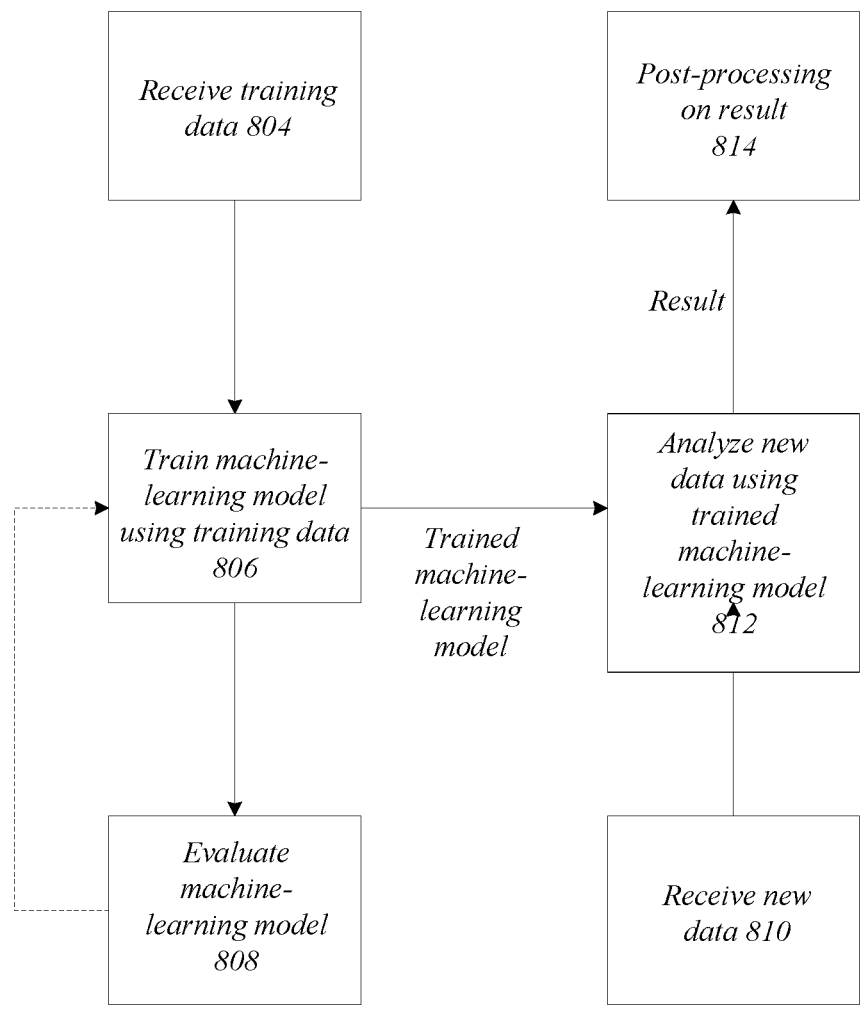
FIG. 8 illustrates an example of a machine-learning flow.

FIG. 8 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion; playing games; optimization and metaheuristics; detecting network intrusions; medical diagnosis and monitoring; or predicting when an asset, such as a machine, will need maintenance.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 8.

In block 804, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model. In embodiments, the training data may include transaction information, historical transaction information, and/or information relating to transaction. The transaction information may be for a general population and/or specific to a user and user account in a financial institutional database system.

In block 806, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model must find structure in the inputs on its own. In semi-supervised training, only some of the inputs in the training data are correlated to desired outputs.

In block 808, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, e.g., the current transaction information, the machine-learning model may have a high degree of accuracy. Otherwise, the machine-learning model may have a low degree of accuracy. The 90% number is an example only. A realistic and desirable accuracy percentage is dependent on the problem and the data.

In some examples, if the machine-learning model has an inadequate degree of accuracy for a particular task, the process can return to block 806, where the machine-learning model can be further trained using additional training data or otherwise modified to improve accuracy. If the machine-learning model has an adequate degree of accuracy for the particular task, the process can continue to block 810.

In block 810, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 812, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 814, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

It will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose and may be selectively activated or reconfigured by a computer program stored in the computer. The procedures presented herein are not inherently related to a particular computer or other apparatus. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus, comprising:
a memory to store instructions; and
processing circuitry, coupled with the memory, operable to execute the instructions, that when executed, cause the processing circuitry to:
receive, via one or more network links, from an automatic teller machine (ATM) a transaction request comprising transaction information for a transaction to withdraw money;
generate a model from historical transaction information associated with historical withdrawal transactions corresponding to the transaction information, wherein the model comprises a predicted norm of transaction data;
perform a computing analysis utilizing the transaction information to determine whether the transaction information is outside the predicted norm of the model,
generate a result of the computing analysis comprising one bit corresponding to a suspicious activity result, wherein the bit includes a result that the transaction is or is not suspicious based on whether the transaction information is outside the predicted norm;
send, via the one or more network links, a transaction response to the ATM in response to the transaction request, the transaction response to comprise an indication of a result of the computing analysis and to cause the ATM to dispense money based on the one bit, and the ATM to store, in memory, serial numbers on the dispensed money based on the one bit indicating the transaction is suspicious; and
in response to determining, based on the one bit, the transaction is suspicious,
communicate with the ATM to determine the serial numbers on the dispensed money, and
send an alert to an emergency service system, the alert comprising identifying information for the transaction and the serial numbers on the dispensed money.

2. The apparatus of claim 1, wherein the transaction information comprises one or more of security token, an account identifier, biometric data, image data, audio data, locale data, and time data, the processing circuitry to perform the computing analysis comprising applying the model trained on historical transaction data associated with historical transactions, wherein the historical transaction data comprises historical transaction information associated with an account identified by the account identifier.

3. The apparatus of claim 1, wherein the identifying information comprises one or more of a locale for the transaction, a time for the transaction, a suspicious activity description for the transaction, an image file for the transaction, a biometric for the transaction, and an audio file for the transaction, the processing circuitry to perform the computing analysis comprising analyzing one or more factors associated with the transaction, the one or more factors comprising a fraud alert setting for the transaction, the locale for the transaction, a number of incorrect security identifiers entered for the transaction, one or more biometric factors for the transaction, and the time for the transaction.

4. The apparatus of claim 1, the processing circuitry to send an alert to a user device associated with the transaction, the user device comprising one of a mobile telephone device, a personal computing device, and a tablet device.

5. The apparatus of claim 1, the processing circuitry to:
send an authentication request to a user device associated with the transaction; receive an authentication response to the authentication request, the authentication response comprising an indication of whether the transaction is authenticated or not authenticated; and
send a message to the ATM in response to the authentication response, the message to permit the transaction in response to the indication of the authentication response indicating the transaction is authenticated and prevent the transaction in response to the indication of the authentication response indicating the transaction is not authenticated.

6. An apparatus, comprising:
a memory to store instructions; and processing circuitry, coupled with the memory, operable to execute the instructions, that when executed, cause the processing circuitry to:
receive, via one or more input devices, a request to perform a transaction to withdraw money;
perform a computing analysis utilizing transaction information associated with the transaction to determine if the transaction is suspicious, the computing analysis comprising at least one of applying one or more factors to the transaction information and applying a model to the transaction information;
determine that the transaction is suspicious based on one or more of a result of the computing analysis indicating that a fraud alert is set, a locale of the transaction is occurring a threshold value range outside of a normal location range, a number of attempts of a security token entry has exceeded a threshold attempt value, one or more biometric factors have failed, or a number of attempts to perform the transaction have exceeded a threshold value within a period of time;
cause dispensing of the money based on the determination that the transaction is suspicious; and
based on determining the transaction is suspicious, the processing circuitry to:
determine one or more serial numbers on the money dispensed based on a scan operation to scan the money dispensed;
store, in the memory, the one or more serial numbers, and
send an alert to an emergency service system, the alert comprising identifying information for the transaction, and the serial numbers stored in the memory.

7. The apparatus of claim 6, wherein the identifying information comprises one or more of a locale of the transaction, a time for the transaction, a suspicious activity description for the transaction, an image file for the transaction, a biometric for the transaction, and an audio file for the transaction, the processing circuitry to perform the computing analysis comprising analyzing one or more factors associated with the transaction, the one or more factors comprising a fraud alert setting for the transaction, the locale of the transaction, a number of incorrect security identifiers entered for the transaction, one or more biometric factors for the transaction, and the time for the transaction.

8. The apparatus of claim 6, the processing circuitry to perform the computing analysis comprising applying the model trained on historical transaction data associated with historical withdrawal transactions, wherein the transaction information comprises one or more of security token, an account identifier, biometric data, image data, audio data, locale data, and time data and wherein the historical transaction data comprises historical transaction information associated with an account identified by the account identifier.

9. The apparatus of claim 6, the processing circuitry to cause dispensing at least a portion of the money having stored serial numbers from a drawer of money having serial numbers pre-stored in the memory.

10. The apparatus of claim 6, the processing circuitry to cause dispensing the money with serial numbers pre-stored in the memory intermingled with the money having serial numbers not pre-stored in the memory.

11. The apparatus of claim 6, the processing circuitry to send an alert to a user device associated with the transaction, the user device comprising one of a mobile telephone device, a personal computing device, and a tablet device.

12. The apparatus of claim 11, the processing circuitry to:
send an authentication request to the user device;
receive an authentication response to the authentication request, the authentication response comprising an indication of whether the transaction is authenticated or not authenticated;
permit the transaction in response to the indication of the authentication response indicating the transaction is authenticated; and
prevent the transaction in response to the authentication response indicating the transaction is not authenticated.

13. The apparatus of claim 6, wherein the transaction response comprises a percentage likelihood that the transaction comprises fraudulent activity.

14. A non-transitory computer-readable storage medium storing computer-readable program code executable by a processor to:
receive, via one or more input devices, a request to perform a transaction to withdraw money;
send, via one or more network links, to a server a transaction request comprising transaction information for the transaction, the transaction information comprising a security token for the transaction and an account identifier for the transaction;
receive, via the one or more network links, a transaction response to the transaction request from the server, the transaction response comprising an indication of a first result of a computing analysis performed with the transaction information, and the transaction response comprising a second result of an analysis of the security token, the indication of the first result of the computing analysis comprising one or more bits which may be set if the computing analysis detects suspicious activity based on one or more of:
a detection of activity outside of a norm predicted by a model;
a violation of one or more rules;
a violation of a statistical average for a data point; or
a failure of a biometric analysis;
cause dispensing of the money based on the transaction response; and
based on the indication of the first result of the computing analysis being set to indicate the detection of the suspicious activity, store one or more serial numbers of the money dispensed, and
send an alert to an emergency service system, the alert comprising identifying information for the transaction and the serial numbers stored.

15. The non-transitory computer-readable storage medium of claim 14, further comprising computer-readable program code executable to cause dispensing the money having stored serial numbers from a drawer having money with serial numbers pre-stored in memory.

16. The non-transitory computer-readable storage medium of claim 14, further comprising computer-readable program code executable to cause dispensing the money with serial numbers pre-stored in memory intermingled with the money having serial numbers not pre-stored in the memory.

17. The medium of claim 14, the computing analysis comprising applying the model trained on historical transaction data associated with historical withdrawal transactions of prior users of automatic teller machines (ATMs).

18. The medium of claim 17, further comprising computer-readable program code executable to, based on a degree or a level of certainty of the first result of the computing analysis, cause two-factor authentication for the transaction to be performed, cause a notification to be sent to a device associated with an account associated with the transaction, or both.

19. The medium of claim 14, wherein the rules comprise one or more of whether a fraud alert has been triggered for an account associated with the transaction, whether a time of the transaction is suspicious, whether the transaction is outside of a location set by an owner associated with the account identifier, whether the transaction is for an amount above a threshold value; and wherein the rules are preconfigured based on user input, model training techniques, or both.

20. The medium of claim 14, wherein the request is a request to withdraw money from an automatic teller machine (ATM), and wherein the identifying information comprised by the alert includes one or more of a location of the ATM, a time of the transaction, a description of the suspicious activity, or biometric information, wherein the biometric information comprises one or more of a fingerprint of a user, a gait video of the user, a gait image of the user, a height image of the user, an audio sample of the user, or a facial image of the user.

* * * * *